(12) United States Patent
Inagaki et al.

(10) Patent No.: US 7,780,244 B2
(45) Date of Patent: Aug. 24, 2010

(54) VEHICLE BRAKE DEVICE

(75) Inventors: Hiromi Inagaki, Saitama (JP); Yasuhiro Arikawa, Saitama (JP); Hidetoshi Kobori, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1179 days.

(21) Appl. No.: 11/330,663

(22) Filed: Jan. 12, 2006

(65) Prior Publication Data

US 2006/0152076 A1  Jul. 13, 2006

(30) Foreign Application Priority Data

Jan. 13, 2005  (JP)  ............... 2005-006543

(51) Int. Cl.
*B60T 8/36* (2006.01)
(52) U.S. Cl. ............. 303/89; 303/119.2; 303/191
(58) Field of Classification Search ........ 303/116.2, 303/119.2, 119.3, DIG. 10, 89, 191
See application file for complete search history.

(56) References Cited

U.S. PATENT DOCUMENTS

| | | | | |
|---|---|---|---|---|
| 5,529,389 A | * | 6/1996 | Sekiguchi | ........ 303/116.4 |
| 6,007,164 A | * | 12/1999 | Sakai et al. | ........ 303/122.12 |
| 6,019,436 A | * | 2/2000 | Siepker | ........ 303/13 |
| 6,234,199 B1 | * | 5/2001 | Nohira | ........ 137/557 |
| 6,450,591 B1 | * | 9/2002 | Kawahata et al. | ........ 303/122.05 |
| 7,204,566 B2 | * | 4/2007 | Otomo et al. | ........ 303/119.3 |

FOREIGN PATENT DOCUMENTS

| | | |
|---|---|---|
| JP | 5-19041 U | 3/1993 |
| JP | 10-100876 | 4/1998 |
| JP | 2001-047988 | 2/2001 |
| JP | 2001-151096 A | 6/2001 |
| JP | 2002-178901 A | 6/2002 |
| JP | 2002-347601 A | 12/2002 |

* cited by examiner

*Primary Examiner*—Bradley T King
(74) *Attorney, Agent, or Firm*—Carrier, Blackman & Associates P.C.; Joseph P. Carrier; William D. Blackman

(57) ABSTRACT

Normally opened control valves 5A, 5B are configured into short-time rating valves, and normally opened opening/closing valves 4A, 4B, which are electrically controlled to open and close and are configured into long-time rating valves, are connected in series to the normally opened control valves 5A, 5B between a fluid pressure generating unit M and wheel brakes 8A to 8D.

2 Claims, 4 Drawing Sheets

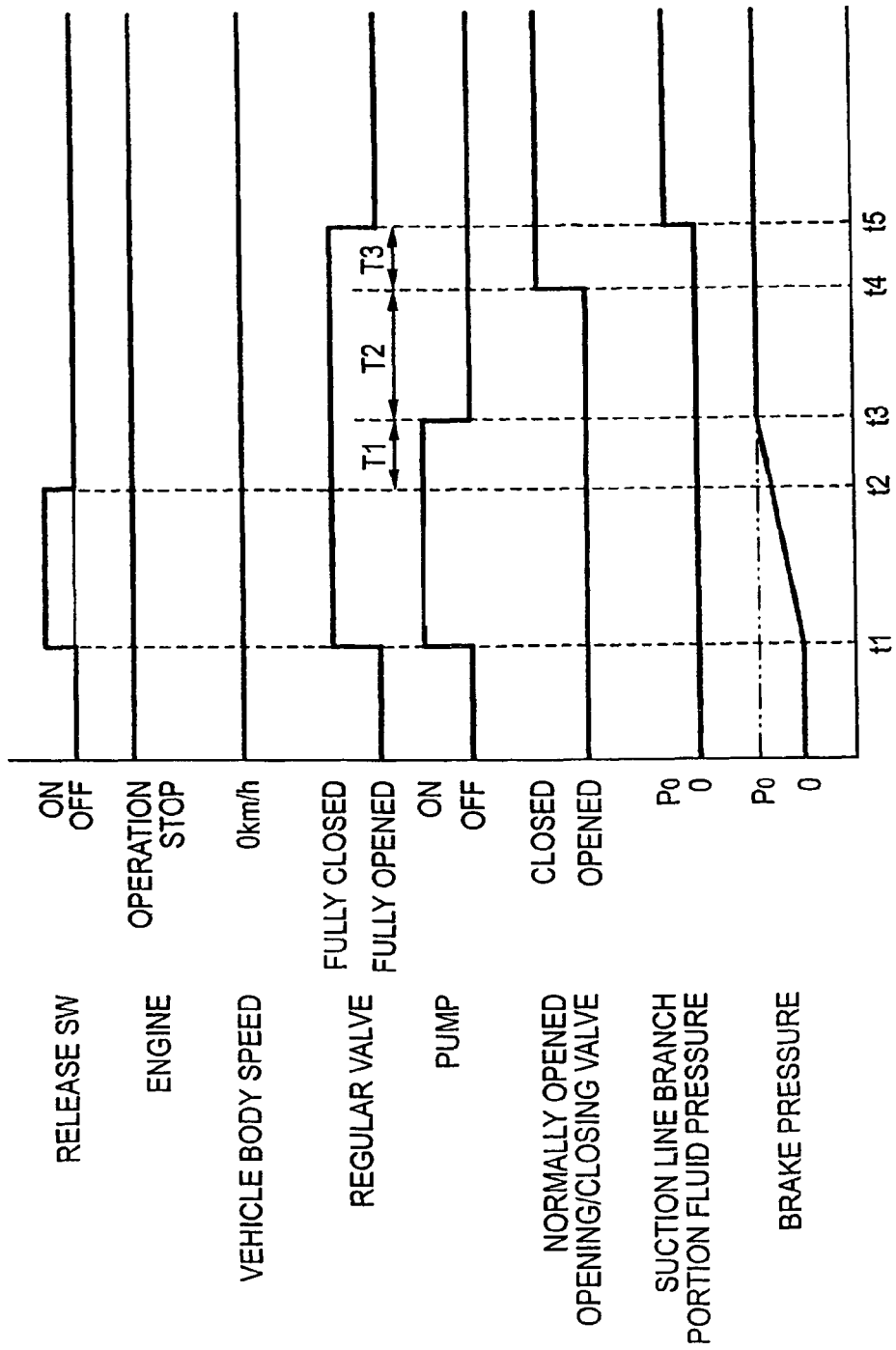

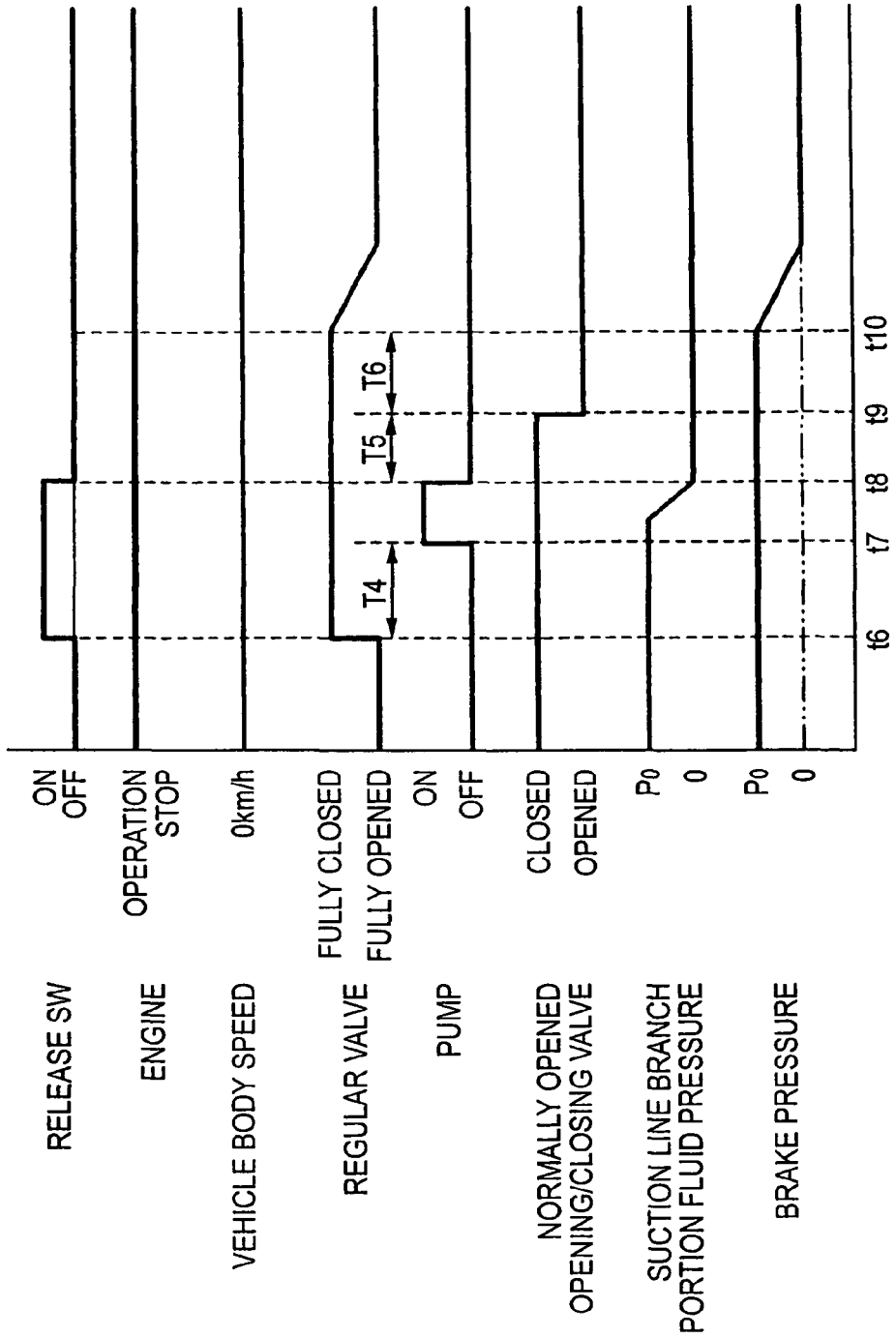

VEHICLE BRAKE DEVICE

The present invention claims foreign priority to Japanese patent application No. 2005-006543, filed on Jan. 13, 2005, the contents of which is incorporated herein by reference.

BACKGROUND OF THE INVENTION

1. Field of the Invention

The present invention relates to a vehicle brake device in which normally opened control valves which are electrically controlled in such a manner as not only to be changed over between a fully opened state and a fully closed state but also to obtain a half opened state between the fully opened and closed states are interposed between a fluid pressure generating unit which generates a fluid pressure in accordance with an operation amount and wheel brakes which are mounted on road wheels.

2. Description of the Background Art

A vehicle brake device is known in, for example, Japanese Patent Unexamined Publication No. JP-A-2001-47988 in which normally opened control valves or proportional solenoid valves which are electrically controlled in such a manner as not only to be changed over between a fully opened state and a fully closed state but also to obtain a half opened state between the fully opened and closed states are interposed between a master cylinder which generates a fluid pressure in accordance with an operation amount of a brake pedal and wheel brakes in order to cause the braking operation of the wheel brakes to continue even after a brake pedal effort was been released when the vehicle stopped in association with application of brakes. In addition, a vehicle brake is known in, for example, Japanese Patent Unexamined Patent Publication No. JP-A-10-100876 in which the normally opened control valves are interposed between hydraulic lines which communicate with outlet sides of pumps which can operate independently from the application of brakes and connect to the wheel brakes and the master cylinder.

In the vehicle brake devices disclosed in the Japanese Patent Publications Nos. JP-A-2001-47988 and JP-A-10-100876, however, when attempting to hold a parking brake in an applied state for many hours, the normally opened control valves need to be held closed for many hours in order to hold brake pressure.

On the other hand, the normally opened control valve is required to have both a quicker response and a fine opening control, and in order to meet the requirements, the normally opened control valve is configured into a short-time rating valve by setting a small inductance for the coil. In such a short-time rating type normally opened control valve, the value of current flowing through the coil provided in the normally opened control valve becomes high, which is thermally disadvantageous, and the thermal capacity of a drive circuit such as a field-effect transistor (FET) which controls the opening of the normally opened control valve has to be set relatively large.

Due to this, in the brake system in which the normally opened control valves are kept closed for many hours in order to hold the parking brake in the applied state, the normally opened control valves become thermally less advantageous, and this calls for enlargement in size of the normally opened control valves and the drive circuit, resulting in an increase in costs.

SUMMARY OF THE INVENTION

The invention was made in view of the situations and an object thereof is to provide a vehicle brake device which can suppress the heat generation of the normally opened control valves even in the event that the parking brake is held in the applied state for many hours to thereby avoid the enlargement of the normally opened control valves and the drive circuit to enable a reduction in costs.

With a view to attaining the object, according to a first aspect of the invention, there is provided a vehicle brake device comprising:

a fluid pressure generating unit which generates fluid pressure in accordance with an operation amount;

a wheel brake mounted on a road wheel;

a normally opened control valve interposed between the fluid pressure generating unit and the wheel brake, and configured into a short-time rating valve, the normally opened control valve being electrically controlled in such a manner as to change over between a fully opened state and a fully closed state and also to obtain a half opened state between the fully opened and the fully closed states;

a normally opened opening/closing valve electrically controlled to open and close, and configured into long-time rating valve, wherein the normally opened opening/closing valve is connected to the normally opened control valve in series between the fluid pressure generating unit and the wheel brake.

Here, the "long-time rating valve" means a valve which can be in operation over many hours, and to be specific, a valve having a long working limit in terms of time in a normally operating state. More specifically speaking, the "long-time rating" valve can be made by increasing the thermal capacity or current capacity of the switching device such as FET of the drive circuit which drives the valve, increasing the heat dissipation capacity of the switching device, decreasing the degree of heat generation of a coil provided in the valve by increasing the thermal capacity of the valve, or cooling the switching device and the coil. In contrast to this, the "short-time rating" valve unit a valve which can be in operation only for a short time.

According to a second aspect of the invention, there is provided a vehicle brake device as set forth in the first aspect of the invention, further comprising:

a housing comprising a hydraulic modulator including:

a reservoir;

the normally opened control valve which is connected to the fluid pressure generating unit via the normally opened opening/closing valve;

a pump having:

a discharge side connected to a hydraulic line which is connected to the fluid pressure generating unit via the normally opened control valve and the normally opened opening/closing valve; and a suction side connected to the reservoir;

a control valve unit which changeably makes and breaks communication between the hydraulic line (of the wheel brake) and the reservoir; and a normally closed opening/closing valve which is provided along a suction line which connects a line define between the normally opened control valve and the normally opened opening/closing valve to the suction side of the pump, wherein the normally opened opening/closing valve is disposed separately from the housing.

According to a third aspect of the invention, there is provided a vehicle brake device as set forth in the first aspect of the invention, further comprising:

a reservoir;

a pump having:

a discharge side connected to a hydraulic line which is connected to the fluid pressure generating unit via the normally opened control valve and the normally opened opening/closing valve; and a suction side connected to the reservoir;

a control valve unit which changeably makes and breaks communication between the hydraulic line of the wheel brake and the reservoir; and a normally closed opening/closing valve which is provided along a suction line which connects a line between the normally opened control valve and the fluid pressure generating unit to the suction side of the pump; and a one-way valve which permits a passage of brake fluid only from a side of the fluid pressure generating unit, wherein a branch portion is defined where the suction line is branched off from the line between the normally opened control valve and the fluid pressure generating unit, the normally opened opening/closing valve is interposed between a branch portion and the fluid pressure generating unit, and the one-way valve is connected in parallel to the normally opened opening/closing valve.

According to a fourth aspect of the invention, there is provided a vehicle brake device as set forth in the first aspect of the invention, further comprising:

a reservoir;

a pump having:

a discharge side connected to a hydraulic line which is connected to the fluid pressure generating unit via the normally opened control valve and the normally opened opening/closing valve; and a suction side connected to the reservoir;

a control valve unit which changeably makes and breaks communication between the hydraulic line (of the wheel brake) and the reservoir; and a normally closed opening/closing valve which is provided along a suction line which connects a line between the normally opened control valve and the fluid pressure generating unit to an suction side of the pump, wherein a branch portion is defined where the suction line is branched off from the line between the normally opened control valve and the fluid pressure generating unit, the normally opened opening/closing valve is interposed between the branch portion and the fluid pressure generating unit, the vehicle brake device further comprises a control unit which controls the operation of the normally opened opening/closing valve, the control valve unit, the normally opened control valve, the normally closed opening/closing valve and the pump, a hold state of the brake fluid pressure is defined such that the brake fluid pressure is held by opening the normally opened control valve and closing the normally opened open/close valve, while the wheel brake is left communicating with the hydraulic line via the control valve unit, when the brake fluid is released from the hold state, the control unit sequentially executes the steps of:

reducing fluid pressure between the normally opened control valve and the normally opened opening/closing valve by virtue of the operation of the pump in a state that the normally opened control valve is closed and the normally opened opening/closing valve is opened;

opening the normally opened opening/closing valve; and controlling the normally opened control valve so as to be in the half opened state.

According to the first aspect of the invention, when a parking brake applied state is attempted to be obtained, the normally opened control valves only have to be closed in such a state that they are de-energized, and when compared to the brake system in which the short-time rating normally opened control valves are held closed while the parking brake is applied, consumed power can be suppressed to a lower level by keeping the normally opened control valves in the de-energized state, and the load that is to be borne by the normally opened opening/closing valves and the drive circuit thereof can also be suppressed to a lower level, thereby making it possible to ensure a long stable operation while suppressing the heat generation from the normally opened opening/closing valves and the drive circuit thereof.

According to the second aspect of the invention, power consumed while the parking brake is applied can be suppressed to a lower level only by disposing the normally opened opening/closing valves separately from the housing of the hydraulic modulator which enables the automatic brake control in which the wheel brakes are activated in a no-brake-applied state, and the invention can easily be applied to the conventional vehicle brake devices which have hydraulic modulators.

According to the third aspect of the invention, since brake fluid flows through the one-way valves in such a manner as to bypass the normally opened opening/closing valves when the pumps are activated with a view to sucking in brake fluid from the side of the fluid pressure generating unit, an increase in suction resistance at the pumps can be suppressed which would otherwise be caused by additionally providing normally opened opening/closing valves.

According to the fourth aspect of the invention, when releasing the brakes applied by releasing the brake fluid pressure from the hold state in which the brake fluid pressure for the wheel brakes is held by opening the normally opened control valves and closing the normally opened opening/closing valves, since the fluid pressure between the normally opened control valves and the normally opened opening/closing valves is first reduced by virtue of the operation of the pumps in such a state that the normally opened control valves are closed, while the normally opened opening/closing valves are opened and thereafter, the normally opened opening/closing valves are opened and furthermore, the normally opened control valves are put in the half opened states, the normally opened opening/closing valves are opened in such a state that a difference in fluid pressure between before and after thereof is small, whereby the generation of operation noise in association with a fluid pressure release occurring when the normally opened opening/closing valves are opened from the closed state. In addition, since the normally opened control valves come into the half opened state after the normally opened opening/closing valves have been opened, the release speed of brake fluid is suppressed, whereby the generation of operation noise that occurs in the normally opened control valves when the brake fluid of the wheel brakes is released.

BRIEF DESCRIPTION OF THE DRAWINGS

FIG. 3 is a timing chart resulting when a parking brake is in operation; and

FIG. 4 is a timing chart resulting when the parking brake is released.

DETAILED DESCRIPTION OF THE PREFERRED EMBODIMENTS

Hereinafter, a mode for carrying out the invention will be described based on an embodiment of the invention shown in the accompanying drawings.

Figure 1:
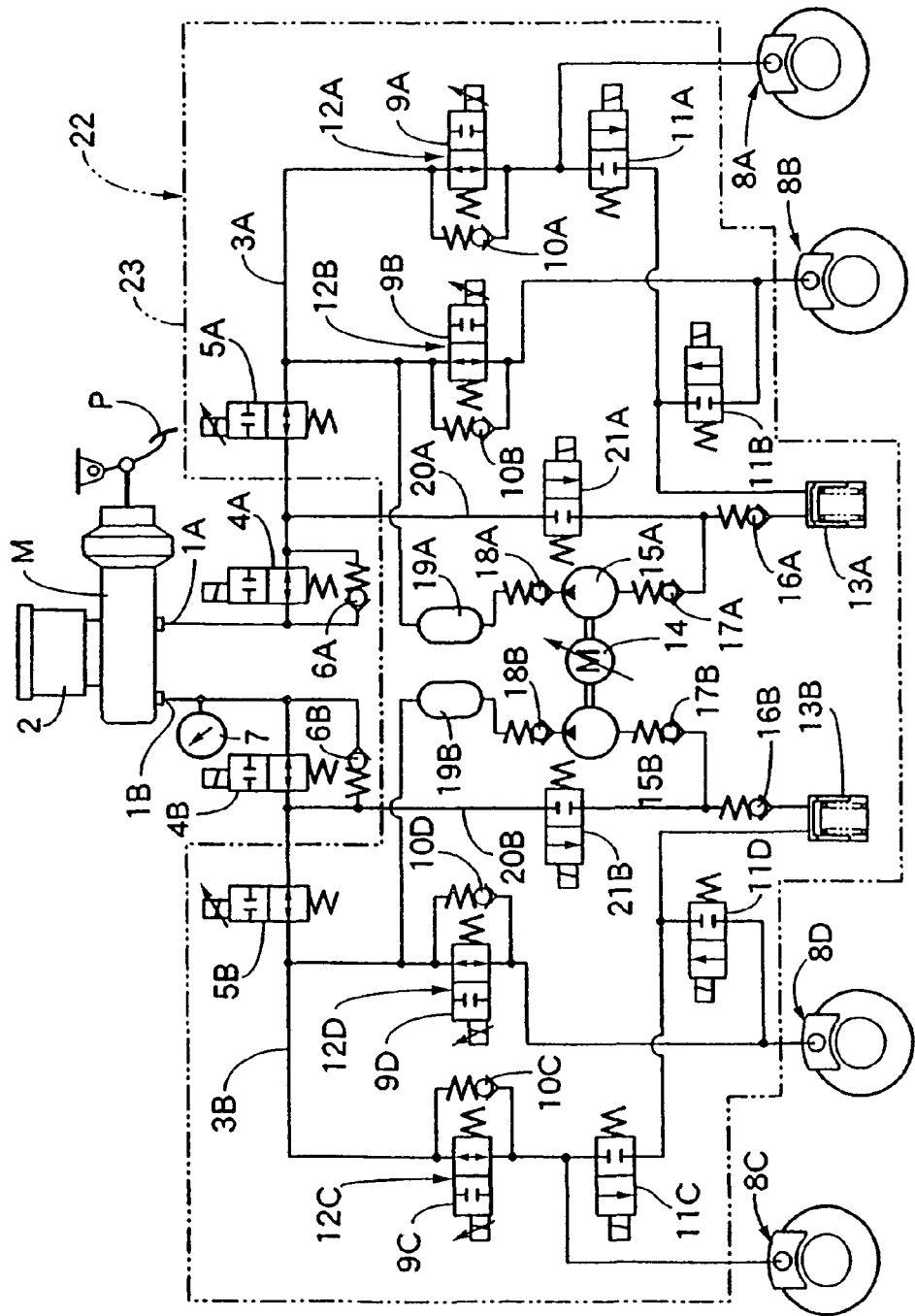
FIG. 1 is a hydraulic circuit diagram of a vehicle brake device.
Figure 2:
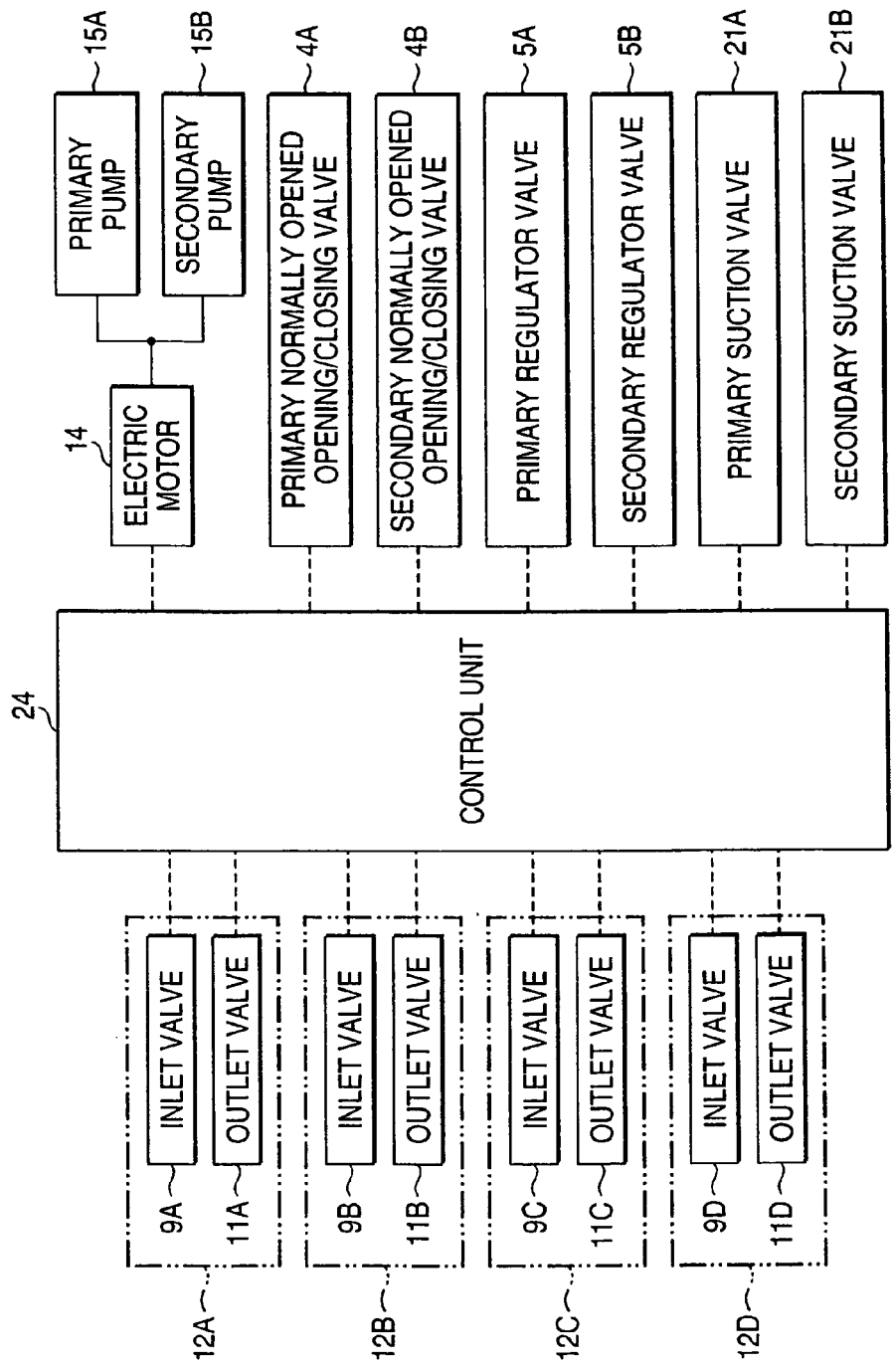
FIG. 2 is a block diagram which shows the configuration of a control system.

FIGS. 1 to 4 are such as to show an embodiment of the invention, in which FIG. 1 is a hydraulic circuit diagram of a vehicle brake device, FIG. 2 is a block diagram which shows the configuration of a control system, FIG. 3 is a timing chart resulting when a parking brake is in operation, and FIG. 4 is a timing chart resulting when the parking brake is released.

Firstly, in FIG. 1, a tandem master cylinder M, which is a fluid pressure generating device for generating a brake fluid pressure in accordance with an amount in which brakes are applied or a pedal effort applied to a brake pedal P by the driver of a vehicle, includes primary and secondary output ports 1A, 1B.

A primary normally opened opening/closing valve 4A, which is electrically controlled to open and close, and a primary regulator valve 5A, which is a normally opened control valve which can be electrically controlled, are connected in series to the primary output port 1A with the primary normally opened opening/closing valve 4A disposed to lie to a side of the master cylinder M, and the primary output port 1A is connected to a primary hydraulic line 3A via the primary normally opened opening/closing valve 4A and the primary regulator valve 5A. In addition, a secondary normally opened opening/closing valve 4B, which is electrically controlled to open and close, and a secondary regulator valve 5B, which is a normally opened control valve which can be electrically controlled, are connected in series to the secondary output port 1B with the secondary normally opened opening/closing valve 4B disposed to lie to a side of the master cylinder M, and the secondary output port 1B is connected to a secondary hydraulic line 3B via the secondary normally opened opening/closing valve 4B and the secondary regulator valve 5B.

The primary and secondary regulator valves 5A, 5B are linear solenoid valves which are electrically controlled in such a manner as not only to be changed over between a fully opened state and a fully closed state but also to obtain a half opened state between the fully opened and fully closed states and are configured into short-time rating valves. In addition, the primary and secondary normally opened opening/closing valves 4A, 4B, which are electrically controlled to open and close, are configured into long-time rating valves.

Here, the long-time rating primary and secondary normally opened opening/closing valves 4A, 4B can operate normally over many hours, and the primary and secondary normally opened opening/closing valves 4A, 4B can be configured into the long-time rating valves by increasing the thermal capacity or current capacity of switching devices such as FETs of drive circuits for driving the primary and secondary normally opened opening/closing valves 4A, 4B, increasing the heat dissipating capacity of the switching devices, reducing the degree of heat generation of coils provided in the valves by increasing the thermal capacities of the coils, or cooling the switching devices and coils. In this embodiment, the primary and secondary normally opened opening/closing valves 4A, 4B are configured into long-time rating valves by increasing the thermal capacities of the coils. In contrast to this, the primary and secondary regulator valves 5A, 5B are required to have both a quicker response and a fine opening control, and in order to meet the requirements, the primary and secondary regulator valves 5A, 5B are configured into short-time rating valves by setting a low inductance for the coils.

In addition, one-way valves 6A, 6B, which permit a passage of brake fluid only from a master cylinder M side, are connected in parallel to the primary and secondary normally opened opening/closing valves 4A, 4B, respectively, and a fluid pressure sensor 7 is connected to between the secondary normally opened opening/closing valve 4B and the secondary output port 1B for detecting an output fluid pressure from the master cylinder M.

The primary hydraulic line 3A is connected to a left front wheel brake 8A which is a disc brake mounted on a left front road wheel via an inlet valve 9A which is a normally opened linear solenoid valve and is also connected a right rear wheel brake 8B which is a disc brake mounted on a right rear road wheel via an inlet valve 9B which is a normally opened linear solenoid valve. In addition, the secondary hydraulic line 3B is connected to a right front wheel brake 8C which is a disc brake mounted on a right front road wheel via an inlet valve 9C which is a normally opened linear solenoid valve and is also connected to a left rear wheel brake 8D which is a disc brake mounted on a left rear road wheel via an inlet valve 9D which is a normally opened linear solenoid valve. Furthermore, check valves 10A to 10D are connected in parallel, respectively, to the inlet valves 9A to 9D.

The left front wheel brake 8A and the right rear wheel brake 8B are connected to a primary reservoir 13A which corresponds to the primary hydraulic line 3A via outlet valves 11A, 11B which are normally closed electromagnetic or solenoid valves, respectively, and the right front wheel brake 8C and the left rear wheel brake 8D are connected to a secondary reservoir 13B which corresponds to the secondary hydraulic line 3B via outlet valves 11C, 11D which are normally closed electromagnetic or solenoid valves, respectively.

Thus, the inlet valve 9A, the check valve 10A and the outlet valve 11A and the inlet valve 9B, the check valve 10B and the outlet valve 11B constitute control valve devices 12A, 12B which changeably make and break communication with the primary hydraulic line 3A for the left front wheel brake 8A and the right rear wheel brake 8B and the primary reservoir 13A, whereas the inlet valve 9C, the check valve 10C and the outlet valve 11C and the inlet valve 9D, the check valve 10D and the outlet valve 10D constitute control valve devices 12C, 12D which changeably make and break communication with the secondary hydraulic line 3B for the right front brake 8C and the left rear wheel brake 8D and the secondary reservoir 13B.

The primary and secondary reservoirs 13A, 13B are connected, respectively, to inlet sides of primary and secondary pumps 15A, 15B which are driven by a common electric motor 14 which can be controlled with respect to the rotational speed thereof via one-way valves 16A, 16B which permit passage of brake fluid to the pumps 15A, 15B and suction valves 17A, 17B, and a discharge side of the primary pump 15A is connected to the primary hydraulic line 3A via a discharge valve 18A and a primary damper 19A, while a discharge side of the secondary pump 15B is connected to the secondary hydraulic line 3B via a discharge valve 18B and a secondary damper 19B.

A primary suction line 20A is branched off between the primary normally opened opening/closing valve 4A and the primary regulator valve 5A, and this primary suction line 20A is connected to a suction side of the primary pump 15A, that is, between the suction valve 17A and the one-way valve 16A. In addition, a secondary suction line 20B is branched off between the secondary normally opened opening/closing valve 4B and the secondary regulator valve 5B, and this secondary suction line 20B is connected to a suction side of the secondary pump 15B, that is, between the suction valve 17B and the one-way valve 16B. Moreover, primary and secondary suction valves 21A, 21B, which are normally closed, are provided along the primary and secondary suction lines 20A, 20B.

Incidentally, the primary and secondary regulator valves 5A, 5B, the primary and secondary reservoirs 13A, 13B, the primary and secondary pumps 15A, 15B, which are driven by the common motor 14, the suction valves 17A, 17B and discharge valves 18A, 18B which are annexed to those pumps 15A, 15B, the one-way valves 16A, 16B which are provided between the primary and secondary reservoirs 13A, 13B and suction sides of the primary and secondary pumps 15A, 15B, the respective control valve devices 12A to 12D, and the primary and secondary suction valves 21A, 21B are provided in the same housing 23 so as to make up a hydraulic modulator 22, while the primary and secondary normally opened opening/closing valves 4A, 4B and the one-way valves 6A, 6B which are connected in parallel to the normally opened opening/closing valves 4A, 4B are arranged separately from the housing 23.

In FIG. 2, the primary and secondary normally opened opening/closing valves 4A, 4B, the primary and secondary regulator valves 5A, 5B, the electric motor 14 which is connected in common to the primary and secondary pumps 15A, 15B, the inlet valves 19A to 19B and the outlet valves 11A to 11D of the respective control valve devices 12A to 12D, and the primary and secondary suction valves 21A, 21B are such as to be controlled by a control unit 24.

Thus, when the suction valves 21A, 21B are opened and the electric motor 14 is activated in such a state that the inlet valves 9A to 9D of the respective control valve devices 12A to 12D are opened while the outlet valves 11A to 11D thereof are closed, the primary and secondary pumps 15A, 15B discharge brake fluid which is sucked thereinto from the master cylinder M side to be pressurized therein to the primary and secondary hydraulic lines 3A, 3B. As this occurs, by controlling the operation of the primary and secondary regulator valves 5A, 5B which can be put in the half opened state, the fluid pressure in the primary and secondary hydraulic lines 3A, 3B can be regulated at a constant level, and by controlling the constant fluid pressure in the primary and secondary hydraulic lines 3A, 3B at the respective control valve devices 12A to 12D, brake fluid pressure can be made to be applied to the respective wheel brakes 8A to 8D individually at different levels, whereby it becomes possible to execute an automatic brake control such as behavior stabilizing control and traction control while the vehicle is running.

In addition, when brakes are applied, the primary and secondary normally opened opening/closing valves 4A, 4B are opened, the primary and secondary regulator valves 5A, 5B are fully closed and the suction valves 21A, 21B are closed, and when there exists no possibility that the respective road wheels are locked up, the inlet valves 9A to 9D of the respective valve control devices 12A to 12D are opened, while the outlet valves 11A to 11D thereof are closed, whereby brake fluid pressure outputted from the primary output port 1A of the master cylinder M is applied to the left front and right rear wheel brakes 8A, 8B via the inlet valves 9A, 9B, respectively, while brake fluid pressure outputted from the secondary port of the master cylinder M is applied to the right front and left rear wheel brakes 8C, 8D via the inlet valves 9C, 9D, respectively.

When the road wheel is about to be locked during the application of brakes, the inlet valve of the inlet valves 9A to 9D which corresponds to the road wheel which is nearing the lockup state is closed and the outlet valve of the outlet valves 11A to 11D which corresponds to the relevant road wheel is opened, whereby part of the brake fluid pressure of the road wheel which is nearing the lockup state is sucked into the primary reservoir 13A or the secondary reservoir 13B, so that the brake fluid pressure of the road wheel which is about to be locked is reduced.

In addition, when holding the brake fluid pressure constant, the inlet valves 9A to 9D are closed and the outlet valves 11A to 11D are closed, and furthermore, when the brake fluid pressure is increased, the inlet valves 9A to 9D are held in an opened state, while the outlet valves 11A to 11D are held in a closed state.

Thus, the brakes can be applied efficiently without causing the road wheels to be locked up by controlling the opening and closing of the respective inlet valves 9A to 9D and the respective outlet valves 11A to 11D.

Thus, since the electric motor 14 operates to rotate while the anti-lock brake control that has been described above is being carried out and the primary and secondary pumps 15A, 15B are driven in association with the operation of the electric motor 14, the brake fluid sucked into the primary and secondary reservoirs 13A, 13B is sucked into the primary and secondary pumps 15A, 15B and is then returned to the master cylinder M side via the primary and secondary dampers 19A, 19B, the primary and secondary hydraulic lines 3A, 3B, the primary and secondary regulator valves 5A, 5B and the primary and secondary normally opened opening/closing valves 4A, 4B. An increase in downward travel of the brake pedal P can be prevented by virtue of the suction of brake fluid in the primary and secondary reservoirs 13A, 13B due to the return of brake fluid to the master cylinder M. Moreover, the pulsation of discharging pressure at the primary and secondary pumps 15A, 15B is suppressed by the action of the primary and secondary dampers 19A, 19B, and the operation feeling of the brake pedal P is damaged in no case by the return of brake fluid to the master cylinder M.

Incidentally, in the invention, when the vehicle is stopped in a no-brake-applied state in which the brake pedal P is not depressed, the control unit 24 energizes and opens the suction valves 21A, 21B, and activates the motor 14, whereby the respective wheel brakes 8A to 8D can be activated to apply the parking brake, and when obtaining such a parking brake applied state, the control unit 24 brings, as shown in FIG. 3, the regulator valves 5A, 5B into the totally closed state in response to an operation switch being switched on at time t1 when the vehicle is stopped with the engine being in an operating state and activates the electric motor 14 to drive the primary and secondary pumps 15A, 15B. In response thereto, the brake pressure at the respective wheel brakes 8A to 8D is increased.

Thus, the control unit 24 stops the operation of the electric motor 14 to thereby stop the primary and secondary pumps 15A, 15B at time t3 when a time TI has elapsed since time t2 when the operation switch was switched OFF, and in this state, the brake pressure at the respective wheel brakes 8A to 8D becomes P0.

Following this, the control unit 24 energizes the primary and secondary normally opened opening/closing valves 4A, 4B to close the same valves at time t4 when a time T2 has elapsed since time t3, and the control unit 24 brings the primary and secondary regulator valves 5A, 5B into de-energized states to fully open the same valves at time t5 when a time T3 has elapsed further since t4, whereby the fluid pressure between the primary and secondary normally opened opening/closing valves 4A, 4B and the primary and secondary regulator valves 5A, 5B, that is, at the branch portions of the suction lines 20A, 20B equals the fluid pressure of the primary and secondary hydraulic lines 3A, 3B, that is, the brake pressure P0 of the respective wheel brakes 8A to 8D.

Thus, the brake pressure P0 of the respective wheel brakes 8A to 8D is held at time t5 when the primary and secondary regulator valves 5A, 5B are brought into the fully closed state and onward, as long as the primary and secondary normally opened opening/closing valves 4A, 4B are closed, whereby the parking brake applied state is held by the respective wheel brakes 8A to 8D.

In addition, when releasing the parking brake applied, as shown in FIG. 4, the control unit 24 brings the primary and secondary regulator valves 5A, 5B into an energized state so as to fully close the same valves while the primary and secondary normally opened opening/closing valves 4A, 4B are left closed at time t6 when a release switch is brought into an ON state, and activates the electric motor 14 so as to drive the primary and secondary pumps 15A, 15B at time t7 when a time T4 has elapsed since time t6. Namely, when releasing the parking brake applied, the control unit 24 brings the primary and secondary regulator valves 5A, 5B into the fully closed state while the primary and secondary normally opened opening/closing valves 4A, 4B are held in the closed state and activates the primary and secondary pumps 15A, 15B in such a state that the primary and secondary suction valves 21A, 21B are opened, whereby the fluid pressure between the primary and secondary normally opened opening/closing valves 4A, 4B and the primary and secondary regulator valves 5A, 5B, that is, the branch portions of the suction lines 20A, 20B is reduced from the value equaling to the brake pressure P0 of the respective wheel brakes 8A to 8D.

The control unit 24 stops the operation of the primary and secondary pumps 15A, 15B, that is, the operation of the electric motor 14 due to the release switch being switched OFF at time t8, and the control unit 24 brings the primary and secondary normally opened opening/closing valves 4A, 4B into de-energized states so as to open the same valves at time t9 when a time T5 has elapsed since time t8. Then, the control unit 24 brings the primary and secondary regulator valves 5A, 5B into the half opened state between the fully opened and fully closed states at time t10 when a time T6 has elapsed further since time t9, whereby the brake pressure of the respective wheel brakes 8A to 8D is released moderately, the parking brake applied being thereby released.

Next, the function of the embodiment will be described. Since the primary and secondary normally opened opening/closing valves 4A, 4B, which are electrically controlled to open and close, are connected in series to the short-time rating primary and secondary regulator valves 5A, 5B between the master cylinder M and the respective wheel brakes 8A to 8D, when a parking brake applied state is obtained while holding the brake pressure of the respective wheel brakes 8A to 8D, the primary and secondary normally opened opening/closing valves 4A, 4B only have to be brought into the energized states so as to close the same valves. Moreover, since the primary and secondary normally opened opening/closing valves 4A, 4B are configured into the long-time rating valves by increasing the thermal capacity of the coils higher than the primary and secondary regulator valves 5A, 5B, when compared to the brake system in which the primary and secondary regulator valves 5A, 5B are held closed while the parking brake is applied, the consumed power can be suppressed to a lower level by holding the primary and secondary regulator valves 5A, 5B in the de-energized states, whereby the load that is to be borne by the primary and secondary normally opened opening/closing valves 4A, 4B and the drive circuits thereof can also be suppressed to a lower level, thereby making it possible to ensure a long stable operation while suppressing the heat generation of the primary and secondary normally opened opening/closing valves 4A, 4B and the drive circuits thereof.

In addition, since the primary and secondary regulator valves 5A, 5B, the primary and secondary reservoirs 13A, 13B, the primary and secondary pumps 15A, 15B, which are driven by the common motor 14, the suction valves 17A, 17B and the discharge valves 18A, 18B which are annexed to those pumps 15A, 15B, the one-way valves 16A, 16B which are provided between the primary and secondary reservoirs 13A, 13B and suction sides of the primary and secondary pumps 15A, 15B, the respective control valve devices 12A to 12D, and the primary and secondary suction valves 21A, 21B are such as to be provided in the same housing 23, while the primary and secondary normally opened opening/closing valves 4A, 4B are such as to be arranged separately from the housing 23, only by disposing the primary and secondary normally opened opening/closing valves 4A, 4B separately from the housing 23 of the hydraulic modulator 22 which enables an automatic brake control in which the wheel brakes 8A to 8D are made to be activated in the no-brake-applied state, the consumed power while the parking brake is applied can be suppressed to a low level, and the invention can easily be applied to the conventional vehicle brake device having the hydraulic modulator 22.

Additionally, since the one-way valves 6A, 6B which permit the passage of brake fluid only from the master cylinder M side are connected in parallel to the primary and secondary normally opened opening/closing valves 4A, 4B, brake fluid flows through the one-way valves 6A, 6B in such a manner as to bypass the primary and secondary normally opened opening/closing valves 4A, 4B, when the primary and secondary pumps 15A, 15B are activated with a view to sucking in brake fluid from the master cylinder M side, and hence, an increase in suction resistance at the primary and secondary pumps 15A, 15B can be suppressed which would otherwise be caused by additionally providing primary and secondary normally opened opening/closing valves 4A, 4B.

Furthermore, since the control unit 24 sequentially executes the steps of reducing the fluid pressure between the regulator valves 5A, 5B and the normally opened opening/closing valves 4A, 4B by virtue of the operation of the primary and secondary pumps 15A, 15B in such a state that the regulator valves 5A, 5B are fully closed, while the normally opened opening/closing valves 4A, 4B are opened, opening the normally opened opening/closing valves 4A, 4B and controlling the regulator valves 5A, 5B so as to be in the half opened states, when the brake fluid pressure for the wheel brakes 8A to 8D is released from a hold state in which the brake fluid pressure is held by opening the regulator valves 5A, 5B and closing the normally opened opening/closing valves 4A, 4B in such a state that the wheel brakes 8A to 8D are left communicating with the hydraulic lines 3A, 3B via the control valve devices 12A to 12D, the primary and secondary normally opened opening/closing valves 4A, 4B are opened in such a state that a difference in fluid pressure between before and after thereof is small, whereby the generation of operation noise in association with a fluid pressure release occurring when the primary and secondary normally opened opening/closing valves 4A, 4B are opened from the closed state. In addition, since the primary and secondary regulator valves 5A, 5B come into the half opened state after the primary and secondary normally opened opening/closing valves 4A, 4B have been opened, the release speed of brake fluid is suppressed, whereby the generation of operation noise that is produced in the regulator valves 5A, 5B when the brake fluid of the wheel brakes 8A to 8D is released.

Thus, while the embodiment of the invention has been described heretofore, the invention is not limited to the embodiment that has been described above, and hence, various changes in design can be made thereto without departing from the spirit and scope of the invention that fall in the scope of the claims of the invention.

For example, while in the embodiment, the vehicle brake device has been described as the control valve devices 12A to 12D being interposed between the primary and secondary regulator valves 5A, 5B, which are normally opened control valves, and the respective wheel brakes 8A to 8D, the invention can, as shown in the Japanese Patent Unexamined Publication No. JP-A-2001-47988, be applied to a vehicle brake device in which a master cylinder, which is a fluid pressure generating device, is connected direct to wheel brakes via normally opened control valves without providing the control valve devices.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A vehicle brake device comprising:
   a fluid pressure generating unit which generates fluid pressure in accordance with an operation amount;
   a wheel brake mounted on a road wheel;
   a normally opened control valve interposed between the fluid pressure generating unit and the wheel brake, and configured into a short-time rating valve, the normally opened control valve being electrically controlled in such a manner as to change over between a fully opened state, and a fully closed state, and also to obtain a half opened state between the fully opened and the fully closed states;
   a normally opened opening/closing valve which is interposed between the fluid pressure generating unit and the wheel brake, is electrically controlled to open and close a fluid passage between the fluid pressure generating unit and the wheel brake, and configured into long-time rating valve; and
   a pump adapted to pressurize the passage between the fluid pressure generating unit and the wheel brake while the communication between the fluid pressure generating unit and the wheel brake is isolated,
   a housing comprising a hydraulic modulator including:
      a reservoir;
      the normally opened control valve which is connected to the fluid pressure generating unit via the normally opened opening/closing valve;
      the pump having:
         a discharge side connected to a hydraulic line which is connected to the fluid pressure generating unit via the normally opened control valve and the normally opened opening/closing valve; and
         a suction side connected to the reservoir;
      a control valve unit which changeably makes and breaks communication between the hydraulic line of the wheel brake and the reservoir; and
      a normally closed opening/closing valve which is provided along a suction line between the normally opened control valve and the normally opened opening/closing to the suction side of the pump,
   wherein the normally opened opening/closing is connected to the normally opened control valve in series between the fluid pressure generating unit and the wheel brake, and
   wherein a suction port of the pump is connected to a position between the normally opened control valve and the normally opened opening/closing valve
   wherein the normally opened opening/closing valve is connected to the housing as an assembly which is separated from the housing.

2. The vehicle brake device as set forth in claim 1, further comprising:
   a second normally closed opening/closing valve which is provided along a suction line between the normally opened control valve and the fluid pressure generating unit to the suction side of the pump; and
   a one-way valve which permits a passage of brake fluid only from a side of the fluid pressure generating unit,
   wherein a branch portion is defined where the suction line is branched off from the line between the normally opened control valve and the fluid pressure generating unit,
   the normally opened opening/closing valve is interposed between a branch portion and the fluid pressure generating unit,
   the one-way valve is connected in parallel to the normally opened opening/closing valve, and
   the wheel brake is pressurized due to fluid from the fluid pressure generating unit side when the second normally closed opening/closing valve is open.

* * * * *